United States Patent [19]

Kunicki et al.

[11] 4,062,672

[45] Dec. 13, 1977

[54] PROCESS FOR IMPROVING THE FRAGMENTATION CAPABILITY OF METALLURGICAL SLAGS AND CINDERS

[75] Inventors: Maryan Kunicki, Germain-les-Corbeil; Michel Roussel, Paris, both of France

[73] Assignee: Entreprise Gagneraud Pere et Fils, Paris, France

[21] Appl. No.: 760,413

[22] Filed: Jan. 18, 1977

Related U.S. Application Data

[63] Continuation-in-part of Ser. No. 545,828, Jan. 31, 1975, abandoned.

[30] Foreign Application Priority Data

Oct. 21, 1974 France .................................. 74.35327

[51] Int. Cl.² .............................................. C21B 3/04
[52] U.S. Cl. ............................................ 75/30; 75/24; 71/30
[58] Field of Search ................... 75/24, 30; 65/19, 20; 106/117, 288 B; 71/30

[56] References Cited

U.S. PATENT DOCUMENTS 2,732,293  1/1956  Perrin ...................................... 75/24

FOREIGN PATENT DOCUMENTS 227,848  12/1925  United Kingdom ...................... 65/20

*Primary Examiner*—M. J. Andrews
*Attorney, Agent, or Firm*—Browdy and Neimark

[57] ABSTRACT

The process consists essentially of injecting into slags and cinders derived from the manufacture and various treatments of irons, cast irons, steels, and non-ferrous metals while they are molten and before or during cooling thereof, dry pulverulent mineral compounds capable of releasing non-polluting gases by thermal dissociation (metallic carbonates in particular). The easily fragmented slags and cinders obtained are usable in many fields such as: building and construction, ground coverings, abrasives, water filtering, fertilizers for agriculture, etc.

14 Claims, No Drawings

PROCESS FOR IMPROVING THE FRAGMENTATION CAPABILITY OF METALLURGICAL SLAGS AND CINDERS

CROSS-REFERENCE TO RELATED APPLICATION

The present application is a continuation-in-part of U.S. application Ser. No. 545,828, filed Jan. 31, 1975, the entire content of which is hereby incorporated by reference, now abandoned.

FIELD OF THE INVENTION

The present invention relates to the field of slag and cinder obtained from the manufacture and various treatments of irons, cast irons, and steels as well as non-ferrous metals. Its particular objective is a process for treating these slags in the molten state in order to increase their capability for fragmentation and/or crushing after cooling.

BACKGROUND OF THE INVENTION

It is knwon that the various slags and cinders from the working and metallurgy of non-ferrous metals such as zinc, lead, copper, chromium, etc. supply materials whose configurations and physical-chemical characteristics vary according to the treatment process applied thereto. Thus, for example, slags from glass furnaces and steel mills can have the form of compact or crystallized alveolar aggregates, vitrified granules, etc.

Most of these slags must, after cooling in the appropriate pit, undergo either fragmentation, as is the case for phosphated or non-phosphated steel mill slags, for example those derived from refining non-phosphorous cast iron, or crushing to a greater or lesser degree as is the case, for example, for steel mill slags from phosphorous cast iron, before utilization in the form of granulate products by adding binders and/or fertilizers.

These crushing and grinding operations of layers of slag and cinder, after cooling in the pit, require high energy consumption because the elements which do not disintegrate immediately are extremely hard; in addition and because of this the machinery employed for this treatment wears rapidly making it necessary to replace frequently the elements designed to fragment and crush slag slabs and aggregates.

True, various means of inducing foaming of slags and thus obtaining multi-cellular masses have been recommended. Among the porophoric, i.e. the foaming agents described, substances such as perlite (French Pat. No. 1,472,795 of Mar. 29, 1966) or carbon black or coal dust rich in volatiles (see for example French Pat. No. 1,489,000 of Sept. 23, 1965) have been recommended. However, perlite, which expands as it crumbles in the slags, causes the latter to increase in volume and in fact coagulate, which is a serious disadvantage for the application envisaged by the invention. In addition, where pulverized coke or coal dust is used, the heat of the molten slag mass is further increased and the injected carbonate material adds no particular property to the slag besides its foaming action and must be considered as wasted.

SUMMARY OF THE INVENTION

The present invention enables these disadvantages to be overcome by pre-treating the slag, before or during cooling, which favors elimination of the hard masses within it and enhances its crumbling properties thus permitting substantial energy and machinery savings. It is based on the fact, known of itself, that highly porous materials are more easily fragmented than materials of the same kind in the compact form.

The present invention offers a series of advantages over known techniques as it proposes the use of porophoric agents which generate gaseous substances by thermal dissociation, which cause an endothermal reaction with the molten slag and which also, after decomposition, furnish enriching elements for the slag.

The new process for treating metallurgical slag according to the invention consists, in its most general form, of injecting into the slags, while they are in the molten state and before or during cooling, pulverulent dry mineral compound capable of releasing non-polluting gases by thermal dissociation.

DESCRIPTION OF THE PREFERRED EMBODIMENTS

As will be explained in greater detail hereinbelow, the introduction of pulverulent material into the molten slag, the temperature of which is generally about 1500° C, causes a release of gas due to decomposition of the substances contained in the appropriate mineral compound and, possibly, to the combination of this compound with certain elements already included in the slag. The gas so released is kept imprisoned in the slag until the latter solidifies completely and a cellular product is then obtained which can easily be crushed and fragmented into particles of the desired size.

Mineral compounds suitable for use in the process of the invention are advantageously composed of metallic salts whose anion group constituting the salt is able to decompose, at the molten slag temperature, without giving off polluting gases such nitrous or sulfuric fumes for example. Among these salts it is particularly advantageous to use metal carbonates such as for example: alkaline-earth carbonates such as calcium or magnesium carbonate, or cabonates of various metals such as: iron, copper, zinc, and the like. While it is possible to use alkali metal carbonates such as potassium carbonate, these are less preferred since the alkali metal cations have a tendency to combine with the silica of the refractory linings of the melting pot, thus creating several problems. Accordingly, granulated slag in which such alkali metal compounds are used cannot be recycled into the metallurgical process.

Of course, instead of using simple carbonates, mixed carbonates can be used, such as, for example, calcium and magnesium carbonate or mixtures of simple and/or mixed carbonates. In practice it is convenient and inexpensive in carrying out the process to use as carbonate materials mineral ores of the various above-mentioned metals such as, for example, calcite, limestone, aragonite, siderite, smithsonite, etc.

As stated above, the pulverulent material must be dry so as to avoid any explosion phenomenon by wet contact with the high-temperature slag. It is thus appropriate, if necessary, to pre-dry the ore used as raw material. However, the use of carbonates which, although partically anhydrous or dry, contain water of constitution, does not involve any special difficulties in implementing the invention.

The particle size of the pulverulent mineral substances injected into the slag is a critical factor. If the particles used are too fine, for example 10 microns or less in diameter, the substance cannot be introduced into the slag since the surface tension barrier cannot be overcome. Conversely, if overly large pellets or agglomerates are used, the uniformly porous and multi-cellular slag mass which is the object of the invention cannot be obtained. In practice it has been found that particle diameters, the majority of which are in a range of 20 microns to 10 mm, could be appropriate in application of the process. Within this range a particle size rich in elements of 500 microns to 3 mm gives particularly advantageous results. The quality of the dry pulverulent material to be introduced into the slag to achieve the desired results can vary within borad limits and is a function of various factors such as the type of salt (carbonate is particular) used, its particle size, the temperature of the slag and its dispersion state when it is cast in the molten state, etc. In particular, and in the case of carbonates especially, proportions of 5 to 30 kg. of product per ton of slag are suitable and, within this range, preferential quantities of 10 to 20 kg. It should be noted however that proportions greater than 30 kg can be introduced if it is desired for example to maximize the use of the slag's heat to achieve decarbonization of the injected material and if the thermal state of the slag permits.

The process of the invention can be implemented according to any process known of itself for incorporating a substance pulverulent at normal temperatures into a mass of slag and/or cinder raised to a temperature of over 1000° C. It is important, however, that the mass of slag be at a temperature sufficiently low to permit the capture of the gases being evolved while the slag is solidifying, thus creating a porous solid, while still high enough to permit the endothermal reaction to take place.

In the conventional method of disposing of slag, particularly that produced as the output in the course of smelting or refining of metals, the molten slag is poured into ladles or pans and transported to a slag yard, which may be far from the converter. The ladles of molten slag are then emptied into pits in the slag yard. After solidification, the cold slag is then dug up by bulldozer or fork-lift, collected and then crushed.

The temperature of the slag being poured from the ladle into the cooling pit is generally within that range which is operable in accordance with the present invention, i.e., not so high as to release the gases, with attendant risk of explosion, or to create substantial foaming, nor so low as to prevent the reaction releasing the gases.

Preferably, a satisfactory technique consists of injecting the pulverulent material into the sheet of slag, while it is being poured between the ladle and the cooling pit. The material may be propelled by compressed air or an equivalent propellant. In practice, very good results are obtained when the jet of powder is directed substantially perpendicularly to the sheet of molten slag. However, other equivalent methods can be used as the invention is not confined to their particular embodiment.

When pulverulent materials such as carbonates are injected under the conditions and according to the characteristics described above, the particles of matter which succeed in penetrating the mass of liquid slag enter into contact with it at a high temperature and are decomposed into carbon dioxide and an oxide of the metal introduced, for example CaO or MgO if a calcium or magnesium carbonate was used. The reaction is endothermal and requires 42.5 Kcals per mole of $CO_2$ released from the $CaCO_3$. Decomposition of the carbonate has two effects:

22.4 liters of $CO_2$ are released per 100 g of material under normal pressure and temperature conditions. At the slag temperature this volume may be multiplied by 5 or 6. The actual volume of gas released per kg of $CaCO_3$ is approximately 1 cubic meter.

The particles of metallic oxides obtained within the slag by carbonate decomposition can serve as centers of formation of dissolved gas bubbles.

Due to the endothermal effect of decomposition of the carbonates, the walls of the slag surrounding the gas bubbles cool down, which enables the gases produced by decomposition of the carbonates to be imprisoned and thus ensure good expansion of the slag.

In addition to the above-cited advantages obtained by the invention, namely, presence in the treated slag of the decarbonization residue which can later participate in the metallurgical operation, if this slag is re-used, as well as reduction of energy consumption and of wear in the crushing equipment when later the treated slag is fragmented, implementation of the new process enables part of the heat of the slag to be recycled (due to the endothermal nature of the decarbonization) and a substantial fuel saving to be made either in the agglomeration system or in the blast furnace if the slag is recycled in the metal-working process. In addition, due to the selection of injection materials recommended by the invention, no noxious gases or fumes containing pullutants are released.

The process according to the invention can be used for treating all types of metallurgical and steel mill slags and cinders. In addition to those cited in the introductory matter of the present text, there can also be mentioned: phosphated slags, hematite slags, blast furnace slags before water granulation (to increase the alpha coefficient) or before treatment with a granulating drum, etc.

An important advantage of the porous slag produced in accordance with the present invention is the fact that porous granules are produced and not a fine powdery product. If desired, these porous granules can be later broken up by crushing in a manner with much less energy expenditure than has been necessary with cooled slag not treated in accordance with the present invention. However, for many end uses, slag with a high percentage of very fine material (material of a particle diameter less than about 250 microns) is to be avoided. For example, very fine particles are physically harmful for the filters utilized in the screening of slags. When a significant proportion of the slag consists of such very fine products, one is obligated to provide a reagglomeration step for these fines. This is not necessary in accordance with the present invention.

On the other hand, it is occasionally desirable to have the slag in as fine a product as possible. For example, when slags of phosphated steels are to be used directly in fertilizers, it is desirable that the product be a fine powder. This can easily be produced by crushing the granules formed in accordance with the present invention, the amount of such crushing being greatly diminished in relation to the prior art.

Accordingly, another object of the invention, as new industrial products, are slag and cinders obtained according to the process described hereinabove. These porous products can, after fragmentation to a suitable particle size, have multiple applications. Among the principal areas of application can be cited in a non-limitative manner: building and construction in the form of light concrete, filler blocks, prefabricated elements with high heat and sound insulation and good fire-resistant properties; water treatment in the form of filter beds; manufacture of abrasives with no free silica, usable for sand-blasting; the making of chemical-resistant and wear-resistant ground coverings, etc. Another field of application, also of great advantage, relates to agriculture, where slags and cinders treated according to the invention can be used as fertilizers and soil alkaline additives. Thus, for example, excellent phosphate fertilizers can be prepared, easy to spread on the ground and with delayed effects, by topping up the products according to the invention, phosphated or non-phosphated, when they are later fragmented, with appropriate quantities of known phosphate compounds.

EXAMPLE 1

The following comparative tests show the great improvement in fragmentability and crushability of metallurgical slag and cinders which have been treated with dry mineral compounds in accordance with the present invention while the slag is being poured in the molten state from the ladle into the cooling pit, as opposed to when these mineral compounds are added while the slag is in the ladle, and further compared to slag to which no dry mineral compounds have been added at all.

Each test has been effected on 1000 kilograms of slag to which has been introduced 20 kilograms of limestone flux ($CaCO_3$). The results of these tests are as follows:

A. The proportion of fines (material of a particle diameter of less than 10 mm) was measured in tests on LD slags issuing from steel converters with the latter treated with pure oxygen.

1. No treatment — about 20% fines in spite of two stages of grinding (jaw crushers and percussion crushers).

2. Treatment with $CaCO_3$ in the ladle about 30% fines without grinding and about 40% after one stage of crushing.

3. Treatment in accordance with the present invention (injection in the discharge of the slag between the ladle and the cooling pit) — about 55% fines without any crushing and at least 80% after only one stage of crushing.

Furthermore, the proportion of products of diameter of less than 250 microns (undesirable) was very small — less than 1% in the case of treatment in accordance with the present invention — whereas it was large in the two other cases (at least 15%).

It can be seen that large amounts of product of the desired granulometry (between 250 microns and 10 mm) are produced by the process of the present invention.

EXAMPLE 2

The following comparative tests relate to the formation of very fine material from phosphate slags. For use as fertilizer it is desirable that such slags be crushed to particles of less than 160 microns. The amounts of time of crushing the entire amount of slag which is necessary to crush the slag up to particles of 160 microns was determined.

1. No treatment — about 100 minutes to obtain 75% of a product of mean particle diameter of less than 160 microns.

2. Slag treated by limestone flux in the ladle — about 100 minutes to obtain the same results as in the untreated slag (no improvement).

3. Slag treated in accordance with the present invention — only 20 minutes to obtain the same result as in the case of untreated slag and slag treated in the ladle.

These results show that, in addition to the other characteristics of the present invention, the mode of placing the pulverulent mineral materials into contact with the slag constitutes a critical factor in accordance with the present invention.

Of course, variations in the manner of implementing the process of the invention and the application potential thereof may be envisaged without thereby departing from the framework of the invention the scope of which is defined by the claims hereinbelow.

What is claimed is:

1. A process for treating metallurgical slags and cinders to modify their physical-chemical characteristics while conserving energy consumption, and to increase their fragmentability and crushability, comprising:

injecting into the slag, by means of compressed air directed substantially perpendicularly to the sheet of molten slag being poured in the molten state from the ladle into the cooling pit, a jet of pulverulent dry material compounds capable of releasing non-polluting gases into the slag by endothermal reaction utilizing a part of the sensible heat of the molten mass of the slag, wherein the temperature of the slag being poured is sufficiently high to permit said endothermal reaction and sufficiently low to permit capture of the gases so produced while the slag is solidifying; and fragmenting or crushing the solidified slag so produced for further use.

2. A process in accordance with claim 1 wherein said mineral compounds are metallic carbonates.

3. A process in accordance with claim 2 wherein said metallic carbonates are non-alkali metal carbonates.

4. A process in accordance with claim 3 wherein said metallic carbonates are selected from the group consisting of alkaline-earth carbonates and iron, copper and zinc carbonates.

5. A process in accordance with claim 2 wherein said carbonates are used in combination in the form of the corresponding mineral ores.

6. A process in accordance with claim 2 wherein said carbonates are in the form of mineral ores selected from the group consisting of limestone, calcite, aragonite, siderite, and smithsonite.

7. A process in accordance with claim 1 wherein said pulverulent mineral compounds have particle diameters the majority of which are between 20 microns and 10 mm.

8. A process in accordance with claim 1, wherein the slag is a steel mill slag.

9. A process in accordance with claim 1, wherein the quantity of injected mineral compounds is between 0.5 and 3% by weight of the slag.

10. A process in accordance with claim 1, wherein the slag is a phosphated steel mill slag.

11. A process in accordance with claim 1, wherein the slag is a non-phosphated slag.

12. A process in accordance with claim 1, further including the step of recycling the solidified fragmented slag, to the metallurgical process by which the slag was produced.

13. A process in accordance with claim 10, wherein said fragmenting or crushing step comprises crushing to a fine powder for use in fertilizer.

14. In a process of making non-phosphates steel in a steel mill in which the molten steel and slag produced are separated and solidified and at least a portion of the slag is fragmented step, recycled to the process for making steel, the improvement whereby the fragmentability of the solidified slag is increased, comprising:
pouring the molten slag into a cooling area; and
injecting into the slag, during said pouring step, pulverulent dry mineral compounds capable of releasing non-polluting gases into the slag by endothermal reaction utilizing a part of the sensible heat of the molten mass of the slag;
wherein the temperature of the slag during said injecting step is sufficiently high to permit said endothermal reaction and sufficiently low to permit capture of the gases so produced while the slag is solidifying.

* * * * *

UNITED STATES PATENT AND TRADEMARK OFFICE
CERTIFICATE OF CORRECTION

PATENT NO. : 4,062,672
DATED : December 13, 1977
INVENTOR(S) : Maryan KUNICKI

It is certified that error appears in the above-identified patent and that said Letters Patent are hereby corrected as shown below:

Column 1, line 60, "carbonate" should read --carbonaceous--

Signed and Sealed this

Seventeenth Day of October 1978

[SEAL]

Attest:

RUTH C. MASON
Attesting Officer

DONALD W. BANNER
Commissioner of Patents and Trademarks